United States Patent [19]

Chikira et al.

[11] Patent Number: 5,386,551
[45] Date of Patent: Jan. 31, 1995

[54] DEFERRED RESOURCE RECOVERY

[75] Inventors: JoEtta S. Chikira, Louisville; Fletcher L. Hill; Nancy R. Jurestovsky, both of Golden, all of Colo.

[73] Assignee: Storage Technology Corporation, Louisville, Colo.

[21] Appl. No.: 49,029

[22] Filed: Apr. 16, 1993

[51] Int. Cl.6 .............................................. G06F 11/00
[52] U.S. Cl. .................... 395/575; 395/650; 371/8.1
[58] Field of Search ............... 395/575, 650; 371/29.1, 371/21.1, 7, 8.1; 364/230.3, 246.3, 246.8

[56] References Cited

U.S. PATENT DOCUMENTS

| | | | |
|---|---|---|---|
| 4,648,031 | 3/1987 | Jenner | 364/200 |
| 4,979,105 | 12/1990 | Daly et al. | 364/200 |
| 5,065,311 | 11/1991 | Masai et al. | 364/200 |
| 5,168,564 | 12/1992 | Barlow et al. | 395/575 |
| 5,247,664 | 9/1993 | Thompson et al. | 395/575 |
| 5,253,184 | 10/1993 | Kleinschnitz | 371/29.1 |
| 5,287,505 | 2/1994 | Calvert et al. | 395/600 |
| 5,293,556 | 3/1994 | Hill et al. | 371/20.1 |
| 5,307,496 | 4/1994 | Ichinose et al. | 364/200 |
| 5,325,525 | 6/1994 | Shan et al. | 364/200 |

Primary Examiner—Robert W. Beausoliel, Jr.
Assistant Examiner—Albert Decady
Attorney, Agent, or Firm—Duft, Graziano & Forest

[57] ABSTRACT

The resource management system first fences all autonomous resources, then shared resources required for a first activity. The first activity is then executed and the domain for the next activity examined to identify common fencing requirements. If the shared resource fencing is unaltered between successive activities, then to resource modification is required and the second activity is immediately executed. Otherwise, the shared resources of the first activity are returned to functional use and the shared resources required for the second activity are then fenced. Release of the autonomous resources is deferred to enable the immediate execution of the second activity. Once the last activity in the work stream is completed, all fencing is removed and all resources returned to functional use.

28 Claims, 6 Drawing Sheets

| AUTONOMOUS DOMAIN | | | | |
|---|---|---|---|---|
| 301 CONTROL REGION | ID | X | CR0 | CR0 |
| 312 RECOVERY FLAG | | 0 | 0 | 0 |
| SHARED DOMAIN | | | | |
| 313 RECOVERY FLAG | | 0 | 0 | 0 |
| 302 CHANNEL ADAPTER | ID | X | C0 | C0 |
| 314 | VALID | 1 | 1 | 1 |
| 303 CACHE CONTROLLER | ID | X | X | CC1 |
| 315 | VALID | 1 | 1 | 1 |
| 304 CACHE RAM | ID | X | X | CR0 |
| 316 | VALID | 1 | 1 | 1 |
| 305 DISK ARRAY | ID | X | X | X |
| 317 | VALID | 0 | 0 | 0 |
| | | A | B | C |

FIG.3

|  | AUTONOMOUS DOMAIN | | | | |
|---|---|---|---|---|---|
| CONTROL REGION | ID | CRO | CRO | CRO | CRO |
| RECOVERY FLAG | | 1 | 1 | 1 | 0 |
| SHARED DOMAIN | | | | | |
| RECOVERY FLAG | | 1 | 1 | 1 | 0 |
| CHANNEL ADAPTER | ID | X | CO | X | CO |
| | VALID | 0 | 1 | 0 | 1 |
| CACHE CONTROLLER | ID | CC1 | CC1 | CC1 | CC1 |
| | VALID | 1 | 1 | 1 | 1 |
| CACHE RAM | ID | CRO | CRO | CRO | CRO |
| | VALID | 1 | 1 | 1 | 1 |
| DISK ARRAY | ID | RG1 | X | RG1 | X |
| | VALID | 1 | 0 | 1 | 0 |
| | | A | B | C | D |

FIG.6

DEFERRED RESOURCE RECOVERY

FIELD OF THE INVENTION

This invention describes the use of a domain structure to manipulate resources within a redundant-resource fault-tolerant customer system, wherein an autonomous domain is created to enable resources to be efficiently and unobtrusively tested concurrent with the operation of the customer system.

PROBLEM

As electronic systems become increasingly more complex, increased gate density and functionality on individual Fled Replaceable Units (FRUs) increase the risk of catastrophic failure from any fault source. Consequently, it is often desirable to make critical functions redundant within the customer equipment. A customer subsystem which contains a multiplicity of redundant functions, however, creates an entirely new class of problem. The additional complexity of interconnecting multiply-redundant functions makes it very difficult to efficiently partition the customer subsystem in order to perform independent and concurrent functional operation, initialization of functions, diagnosis of functions or reconfiguration of functions without disabling the entire subsystem.

In prior art, it is possible to remove entire redundant customer equipments from service by electrically disabling paths to or from such equipment. The term "fencing" was introduced by IBM to describe such a facility. However, this mechanism does not permit efficient resource management. In order to operate effectively, this mechanism requires the duplication of entire equipment so that alternate equipment is available in case a primary equipment is lost due to a failure. This is an extremely costly approach to failure management.

Two methods typically exist to facilitate internal testing of processors in a multiprocessor customer system. One method of testing requires that a processor be removed from service to perform testing, called "offline" testing. The other, or "inline", method of testing requires that a processor share customer work operations with test operations. In a fault-tolerant architecture, these testing methods must be carefully applied to avoid disrupting the operation of the customer system. The fault-tolerant architecture makes use of multiple processors arranged in a way to guarantee the survival of the customer equipment in the event of the failure of one of the multiple processors. The processors can be configured either to maintain a single processor in reserve as a replacement for a failed operational processor, or to maintain all processors operational with the multiple processors having sufficient capacity to absorb the effects of the loss of a failed processor. The concurrently operational processor method represents a more efficient use of apparatus and avoids reliance on an untested offline element as backup. However, the processors in this architecture cannot perform safe testing using either inline or offline method. The term safe testing represents the requirement that all resources that may be tainted by non-functional activity must be completely removed from access and interface with customer operations. On completion of the non-functional activity, all resources must be restored to a known good state, with the processor internal software and data checked for corruption.

Inline testing has a substantial probability that any executing diagnostics can corrupt the data or software in the processor that executes the test procedure. The fault-tolerant architecture is designed to ensure the integrity of customer data throughout processing and the existence of a potentially corrupting influence is an unacceptable factor. Offline testing avoids the problems of inline testing but at the cost of excessive processing resource expenditure. All resources that can be contaminated by offline testing must be fully restored to a known safe condition before being returned to functional processing. Each diagnostic procedure must therefore select the diagnostic environment, remove the processor under test and all required resources from the functional environment, perform the diagnostic test on the processor under test, and then return all resources used during the diagnostic test to a known hardware and software state. This process becomes intolerably time intensive when successive independent tests of multiple resources must be executed to diagnose a problem. The resources removed from functional activity significantly reduce the processing capability of the customer system to perform diagnostic testing, minimizing the benefit of offline testing.

SOLUTION

The above described problems are solved and a technical advance achieved in the field by the domain oriented deferred resource recovery system of the present invention which functions to efficiently construct and manipulate non-functional operating environments within a customer equipment. This capability improves the operational efficiency of the customer system when allocating resources to perform tasks and to regulate the scheduling of testing and recovery operations. The resource management system creates work streams, each of which contains a number of individually executable activities. The resource management system defines a domain structure for each activity in the work stream. This domain contains two types of resources: autonomous resources and shared resources. The autonomous resources are under the exclusive control of a processor which operates independent of all other processors. Shared resources are those resources that are under the arbitrated control of more than one processor, which processors can be autonomous processors.

The resource management system groups activities in the work stream by their relation to common autonomous resource requirements. For the initial activity to execute, all autonomous resources are fenced first, then shared resources are fenced. The initial activity is then executed and the domain for the next activity examined to identify common fencing requirements. If the shared resource fencing is unaltered between successive activities, then no resource modification is required and the second activity is immediately executed. Otherwise, the shared resources of the first activity are returned to functional use and the shared resources required for the second activity are then fenced. Release of the autonomous resources is deferred to enable the immediate execution of the second activity. Once the last activity in the work stream is completed, all fencing is removed and all resources returned to functional use.

The autonomous resource recovery is deferred for as much of the work stream as possible. This eliminates system resource thrashing in the case where a large number of small work activities must be performed in the work stream. In addition, for resource testing and recovery purposes, the resources can be fenced and restored to operational status in parallel with the execution of customer activities without impacting the efficiency of operation of the customer system.

The domain oriented deferred resource recovery system avoids the problems of inline testing while permitting testing concurrently with customer operations. It does this by efficiently making resources temporarily unavailable to customer operations, placing them in a state in which they can be safely tested, and then verifying proper operation before restoring them to customer use. It also avoids the problem of resource expense and unavailability encountered with offline testing by efficiently managing internal customer equipment resources, maintaining customer resource availability within safe, useable bounds, and deferring the time expense of resource recovery until the last possible moment.

BRIEF DESCRIPTION OF THE DRAWING

FIG. 3 illustrates in table form the domain assignment.

FIG. 6 illustrates a chart of sequential non-customer operations.

DETAILED DESCRIPTION

Figure 1:
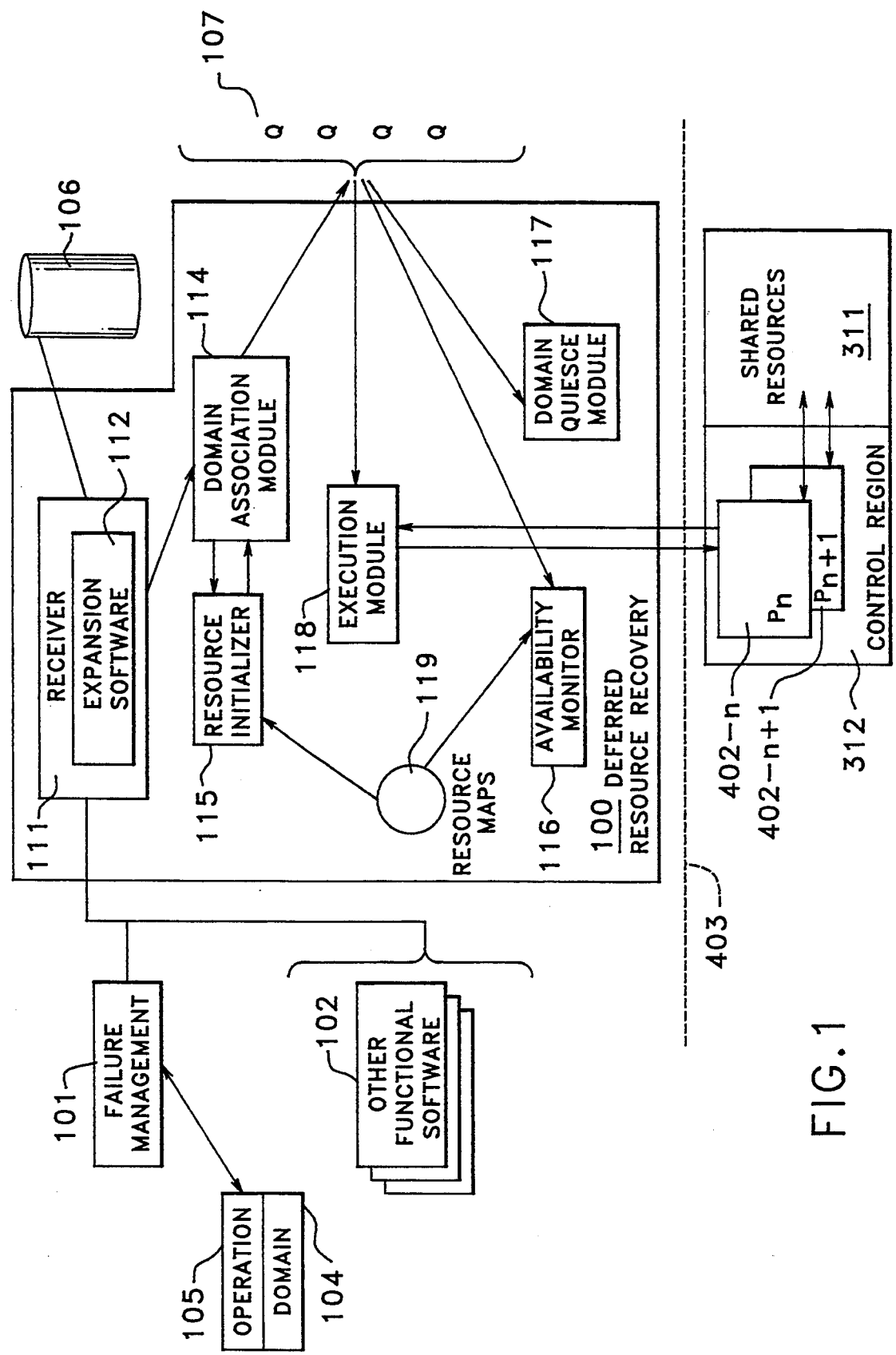
FIG. 1 illustrates a machine initiated maintenance system in block diagram form, including resource management apparatus.

In customer systems that make use of a multiply redundant resource fault-tolerant architecture, there is a need to enable the concurrent activation of both customer operations and non-customer operations, such as maintenance operations. This concurrent activity is possible when resources are reserved for exclusive use of the non-customer functions. Deferred resource recovery is a method of deferring the release of a system resource to customer operations until it is no longer needed for any non-customer operation. To accomplish this, apparatus is included in the customer system to manage the activation and implementation of all non-customer operations. The deferred resource recovery apparatus receives all requests for non-customer operations, and identifies all the types of system resources that are required to implement the non-customer operation. The deferred resource recovery apparatus then selects specific resources for each identified type of resource to implement the non-customer operation and suspends customer activity on those selected resources. Once all the resources required to implement a non-customer operation are thus available, the deferred resource recovery apparatus enables the execution of the non-customer operation concurrently with ongoing customer operations. When the non-customer operation is completed, the deferred resource recovery apparatus recovers the functional state of all the resources used in the operation and returns these resources to availability for customer activity.

When multiple non-customer operations are scheduled, the deferred resource recovery apparatus makes use of grouping logic to efficiently cycle the resources into and out of customer service. The grouping logic identifies resources that are used in common during the multiplicity of non-customer operations. Non-customer operations that share resources are queued so that they execute together. Multiple queues may be formed, one for each variation in resource requirements. A benefit of resource grouping is that it is only necessary to perform the resource selection and customer activity suspension operations on those common resources once, for the first non-customer operation in the queue. It is also possible to defer recovery of these resources to customer operations until the last queued non-customer operation that requires use of this resource is complete. This reduces resource conflict and thrashing to a significant degree.

Customer system resources are allocated by use of domains. The deferred resource recovery apparatus creates a generalized domain that specifies the types of system resources that are required to implement a non-customer operation. A specific domain is then defined to identify the specific system resources that are used within the generalized domain to implement the non-customer operation. Resource recovery is expedited by deferring the return of system resources to customer operation until a change in domain specification is observed. This is done with a "lookahead" process in the deferred resource recovery apparatus in combination with a queuing mechanism. The lookahead process examines the stream of new non-customer operations that are selected and sorts them into queues by domain. The deferred resource recovery apparatus prevents conflict among the queues and between the queues and resources required to implement customer operations by conserving a minimum level of customer availability and by preventing multiple domains from using the same shared resource.

Customer System General Architecture

Figure 4:
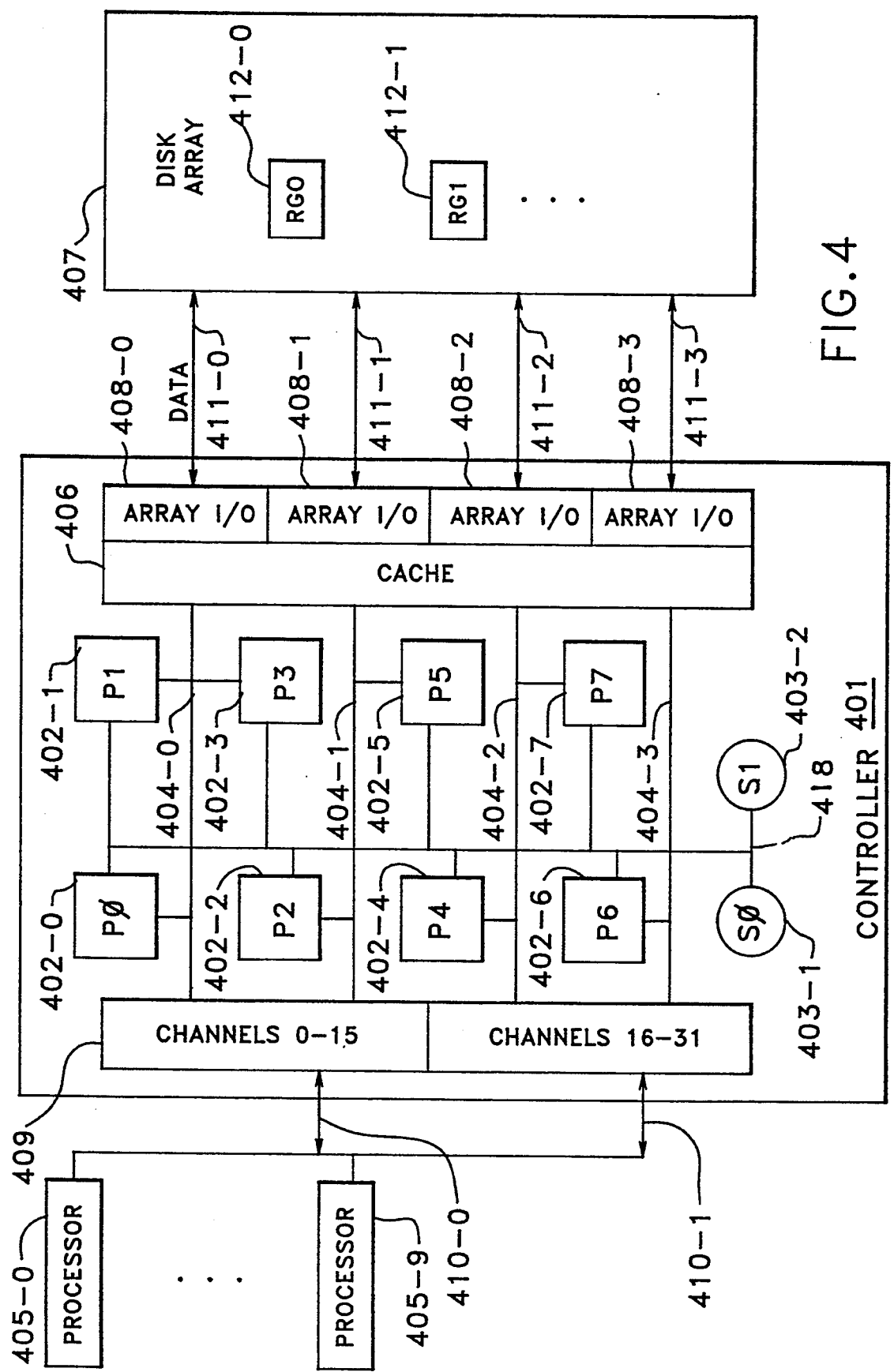
FIG. 4 illustrates the topology of the customer system.

FIG. 4 illustrates in block diagram form the overall architecture of a controller complex 401 of a fault tolerant disk drive array data storage subsystem. Controller complex 401 functions as an interface between a plurality of processors 405-* and a plurality of disk drives that are configured into a disk drive array 407 that comprises a plurality of redundancy groups 112-*, each redundancy group 112-* including a plurality of disk drives. The operation of a disk drive array data storage subsystem is well known and emphasis is placed on the controller complex 401, since it is typically implemented using a fault tolerant architecture that consists of multiply redundant system elements to insure continued operation of the controller complex 401 even if one or more system elements fails to operate. The controller complex 401 exchanges control and data signals with the host processors 405-* via data channels 410-*, each of which data channels 410 is terminated on one of a plurality of channel interface adapter circuits contained within channel 409. Pairs of functional processors 402-* control the transmission of the data received from the host processors 405 between the channel interface 409 and the cache memory 406 via bus 404-*. A plurality of array input/output interfaces 408-* interconnect cache memory 406 with the disk drives of the disk array 407 by corresponding data links 411-*. Support processors 403 are connected to the functional processors 402 via maintenance bus 418. The eight functional processors 402 are grouped into control regions, each consisting of a pair of processors 402. The control region operates to execute customer commands to pass data to and from the disk array 407 in response to commands received from an associated host processor 405. The support processors 403 operate independently and asynchronously from the eight functional processors 402. The support processors 403 communicate with the functional processors 402 via maintenance bus 418 to perform failure management and deferred resource recovery as well as any other non-customer operations that may be defined.

Deferred Resource Recovery Apparatus Architecture

FIG. 1 illustrates in block diagram form the operational structure of a segment of the software that resides on the support processor 403, including the deferred resource recovery apparatus 100. Deferred resource recovery apparatus 100 responds to requests from failure management software 101 and other functional software 102 to execute non-customer operations by regulating the allocation of resources to implement the non-customer operations. The failure management software 101 operates in well known fashion by receiving failure indications from the various operational elements within the data storage subsystem (customer equipment) and using these indications to identify a failed element. The identification of a failed element is accomplished by execution of diagnostic procedures. The failure management software 101 generates requests to remove resources from customer operation, runs diagnostics on suspected failed resources and then stages resource removal and replacement operations. Thus, each request from the failure management software 101 can be in the form of a plurality of non-customer operations, each of which has associated therewith a generalized domain. The generalized domain is created by the failure management software 101 or could be created by the deferred resource recovery apparatus 100 and consists of a listing of all resource types which are required to implement the non-customer operation. Partial specificity may be included in the generalized domain wherein the failure management software 101 identifies specific resources that are identified diagnostic targets. A generalized domain contains three essential features: an autonomous domain which identifies those resource types which operate in an independent mode, a shared domain which identifies resources that are shared or arbitrated for among autonomous domains, and domain recovery flags which indicate whether resource recovery is to be deferred for either domain. The domain recovery flags also indicate the disposition of the non-customer operation if resources are not immediately available.

The deferred resource recovery apparatus 100 receives a request to execute a non-customer operation from an element, such as failure management software 101, in receiver 111. Often, a request can be expanded into a sequence of non-customer operations and this determination is made by expansion software 112 that is contained within receiver 111. Expansion software 112 queries database 106 to determine whether the received request maps to a stored sequence of non-customer operations that are stored in database 106. If so, expansion software 112 retrieves the sequence of non-customer operations from database 106. Expansion software 112 also propagates the resource recovery flags and other specifications associated with the received request into all of the non-customer operations that are retrieved from the stored sequence of operations. Receiver 111, in response to the received request and retrieved sequence of operations, transmits data to execution module 118 indicating that a request has been received. Furthermore, receiver 111 transmits the non-customer operations associated with the request to the Domain Association Module 114. The Domain Association Module 114 maintains a plurality of queues 107 that contain data indicative of the work that remains to be processed by support processor 403. Each queue 107 is associated with a control region. The Domain Association Module 114 indicates when work is active in any of the queues 107 and operates with Resource Initializer 115 to associate new work to a selected one of queues 107. Resource Initializer 115 operates to identify and assign resources to non-customer operations according to the requirements specified in the generalized domain that is associated with each non-customer operation. In order to understand the operation of Domain Association Module 114 and Resource Initializer 115, a description of the domain structure of the deferred resource apparatus 100 is necessary.

Domain Structure

Figure 5:
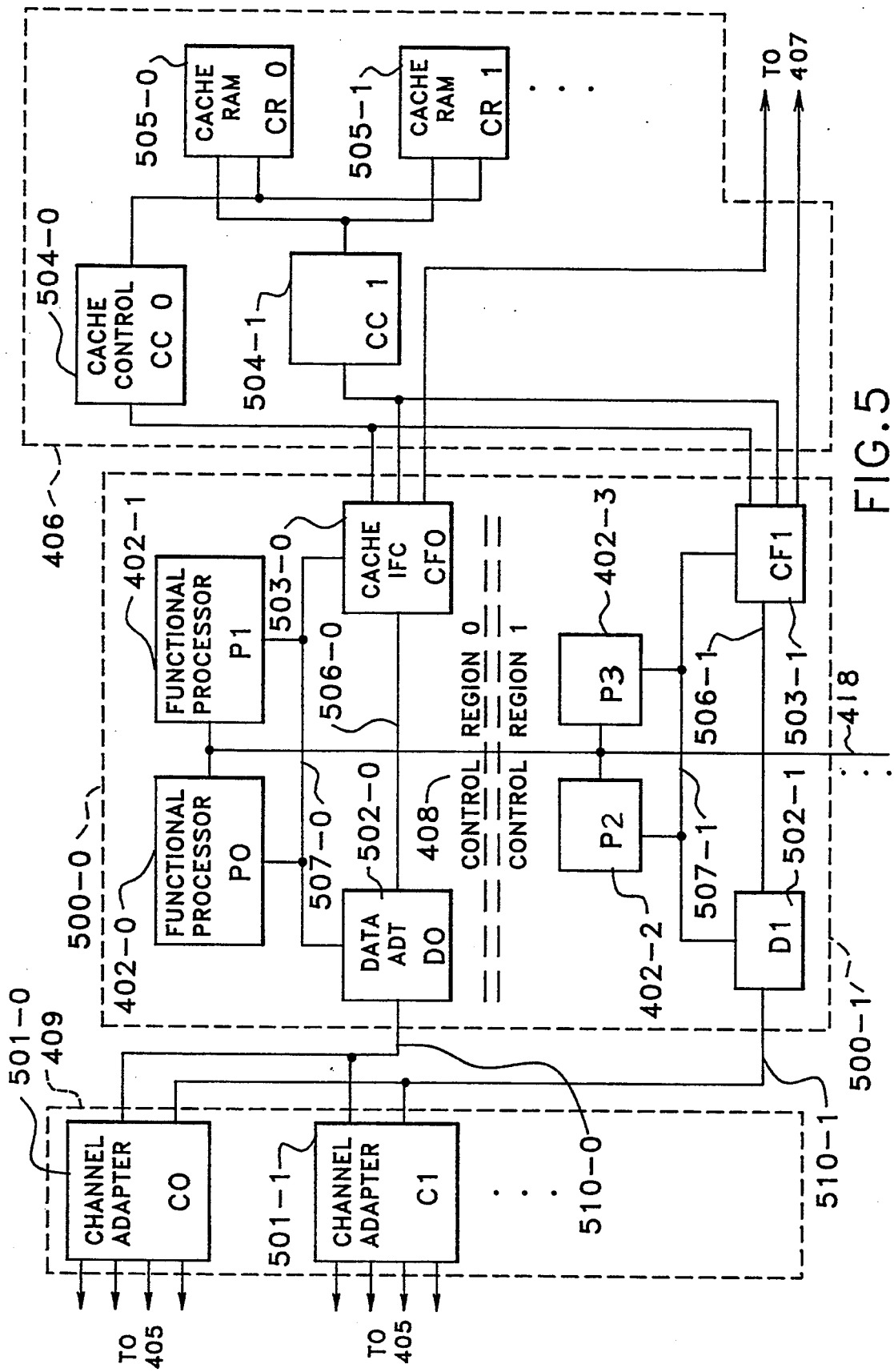
FIG. 5 illustrates additional details of the controller element in the customer system.

Many fault tolerant electronic systems implement a strategy of using multiply redundant resources for critical functions. This strategy ensures that a failure of one of a set of redundant resources does not affect the rest of the set. With this strategy, the survival of the system is guaranteed in the event of the failure of any single element. FIG. 5 illustrates the multiply redundant architecture of controller complex 401 in more detail. Two of the control regions 500-0, 500-1 are illustrated and represent autonomous resources that have access to shared cache and channel resources in operation, a request is received from a host processor 405-0, in one of the channel adapter circuits 501-0 of channel interface 409 and passed to one of the control regions 500-0 via bus 510-0. Within the control region 500-0, two functional processors 402-0, 402-1 condition the data path to transfer data between an automatic data transfer circuit 502-0 and a cache interface 503-0 to store data received from the host processor 405-0 into the cache memory 406 or to transfer it to the disk drive array 407 via array I/O 408.

The internal structure of any system that uses a multiply redundant architecture for some or all of its resource types may be represented in terms of repeating structures in a node-path network. In a node-path network, each hardware resource unit is represented by a node and each node has data and control paths which connect it to other nodes. Very often nodes themselves contain an internal node-path architecture with repeating elements, guaranteeing the survival of partial node functionality for any single internal failure. Each resource node is replicated at least N+1 times, where N is the maximum number of nodes that can be in functional use at any time. Alternative redundancy methods exist where resources are grouped into N arrays of M nodes each, where M represents the number of identical elements needed for survival of the group.

The controller complex architecture illustrated in FIG. 5 implements both methods. The controller complex contains four control regions 500-* of two functional processors 405-*, wherein loss of a single processor does not cause loss of the control region in which it resides. Cache memory 406, however, contains only a sufficient reserve of cache to permit continued operation of cache memory 406 in the event of at least one failure. This reserve typically amounts to one additional FRU.

A node-path map may be drawn showing activation of the following resources to move data from a host processor 405 to the cache memory, 406 as follows:

$$Cn \rightarrow Dn \rightarrow Pn, Pnt1 \rightarrow CFn \rightarrow CCn \rightarrow CRn$$

That is, the data transfer proceeds from a channel adapter circuit 501 that receives the data from a host processor 405 to one of a plurality of control regions 500. From the control region 500, the data is transferred to a cache control circuit 504 and thence to a random access memory 505 contained within the cache 406. A specific domain can be assigned from the channel 409 to the cache 406 using selected resource nodes as follows:

$$C0 \rightarrow D0 \rightarrow P0, P1 \rightarrow CF0 \rightarrow CC1 \rightarrow CR0$$

$$501\text{-}0 \rightarrow 502\text{-}0 \rightarrow 402\text{-}0,1 \rightarrow 503\text{-}0 \rightarrow 504\text{-}1 \rightarrow 505\text{-}0$$

Using the same resource types, a different specific domain map may be generated by using an alternate set of resources to accomplish the same result as follows:

$$C0 \rightarrow D1 \rightarrow P2, P3 \rightarrow CF1 \rightarrow CC0 \rightarrow CR0$$

$$501\text{-}0\text{-}43 \; 502\text{-}1 \rightarrow 402\text{-}2,3 \rightarrow 503\text{-}1 \rightarrow 504\text{-}0 \rightarrow 505\text{-}1$$

In general terms, an array of nodes exists for each shared resource type. A processor selected for operation uses resources from these arrays of nodes with the restriction that no more than one node from any resource array is selected for any given operation. Not all resource arrays are used in any single operation. Likewise any operation includes or excludes resources from any resource array as required by the specifics of the selected operation.

Given this architecture, it is possible to construct the processor's domain of operation, which contains one element from each resource array of the plurality of types of resources required to execute this non-customer operation. This generalized domain defines the set of resource types that satisfy the processor operational requirement to execute this non-customer operation. That is, the processor always selects resources from the resource types identified in the generalized domain and never selects resource types outside of its generalized domain. For any single operation, some elements within the processor's generalized domain are idle and some are operating cooperatively.

A generalized domain for the operation indicated above is shown in FIG. 3 as the entries on line A. The generalized domain A consists of a control region node 301, a channel adapter node 302, a cache control node 303, a cache RAM node 304 and a device node 305. Valid indicators 31* are set to indicate each resource type that is required to implement the data transfer identified by this selected non-customer operation request. Note that the device node 305 does not have a valid indicator 315 since the data is to be transferred from the host processor 405 to the cache memory 406 and not to the disk drive devices contained in the disk drive array 407. Also note that the control region node 301 has no valid indicator because it is required for every possible non-customer operation that can be implemented in the system. FIG. 3 also illustrates a partially specified generalized domain as the entries on line B. The use of a partially specified domain B is to test subsets of the apparatus and, for example, the entries illustrated in FIG. 3 can be used in a non-customer operation to test the ability of control region 0 (500-0) to correctly interface with channel adapter 0 (501-0). Note that additional resources are required but not specified within the partially specified generalized domain B. The unspecified resources 303, 304 are assigned by the deferred resource recovery apparatus 100 prior to executing the non-customer operation. The partially specified domain B however limits the choices that are available to the deferred resource recovery apparatus 100 by indicating a specific channel adapter 501-0 that is to be used and the specific control region 500-0 that is to be used to implement the non-customer operation. Also shown on FIG. 3 is a fully specified domain indicated by the entries on line C. Specific domain C is assigned by the deferred resource recovery apparatus 100 to the partially specified domain B noted above. Note that the domain recovery flags 312, 313 are configured to indicate that full recovery is to take place for the resources that are allocated to the fully specified domain C. Even when the generalized domain A is known for given non-customer operation, it is obvious from this example that the specific resources that are selected by the deferred resource recovery apparatus 100 to implement the generalized domain A are not predictable in advance and can vary with each instance of execution. There are typically a number of instances of the generalized domain A that can be selected by the deferred resource recovery apparatus 100. The specific domain C represents a selected one of these plurality of instances and lists the resources that are cooperatively operative during the non-customer operation.

Autonomous and Shared Domains

It is expensive to construct electronic equipment with multiple functional processors 402* in which each functional processor's domain of operation is electronically and physically separate from all the other functional processors. It is desirable to allow certain resource types to be shared through arbitration among multiple functional processors 402*. In the architecture illustrated in FIG. 5, some resource types within the functional processor's domain of operation are dedicated to that functional processor 500-0 and some are shared with other functional processors 500-1. The generalized domain A is therefore subdivided into two parts, consisting of an autonomous domain and a shared domain. The autonomous domain consists of those resource types that are not shared with any external functional processor 402* or control region 500*. A shared domain consists of those resource types for which a functional processor 402* must arbitrate with the other functional processors 402 outside of its control region. Since control region 500-0 is treated as a single resource entity consisting of two functional processors 402-0, 402-1, a control bus 507-0, a data path 506-0, automatic data transfer circuit 502-0, and cache interface circuit 503-0, it comprises the autonomous domain for any non-customer request where that control region 500-0 is selected by the deferred resource recovery apparatus 100. Resources external to this control region 500-0 consist of the channel adapters 501-*, cache controllers 504-*, cache RAM devices 505-* and the disk drive array 407 devices which are resources that are available to all the functional processors 402*, and represent shared domain resources. Therefore, a generalized domain A typically includes elements that are within an autonomous domain consisting of a control region 500-0 as well as devices that are part of a shared domain consisting of the channel adapter circuits 501-*, the portions of the cache 406 and disk drive array 407 required to implement the non-customer operation. As can be seen from the examples noted in FIG. 3, the types of resources required to implement a non-customer operation is a function of the specific type of non-customer operation that is selected by the failure management software 101 or other functional software 102 that is resident in the support processors 403. In addition, extension of this concept applies to other elements within the data storage sub-system that are not illustrated in FIG. 4 and 5 but which may be required to implement a non-customer operation selected by the failure management software 101.

Queues

Returning to the above description of the Resource Initializer 115 and Domain Association Module 114, the Domain Association Module 114 maintains queues 107 of work to be processed. One queue 107 exists for each possible autonomous specific domain. Domain Association Module 114 indicates when work is active in any of the plurality of queues 107 and works with Resource Initializer 115 to associate new work to a selected one of the plurality of queues 107. Resource Initializer 115 operates to identify and assign resources to non-customer operations according to the requirements that are specified in the generalized domain that is noted by the requesting software or by the sequence of non-customer operations that are retrieved from the data base 106 by expansion software 112. The Resource Initializer 115 examines the Domain Association Module 114 queue status to determine whether one of the queues 107 is active for any autonomous specific domain. If so, Resource Initializer 115 obtains and assigns the autonomous specific domain of the selected one of the plurality of queues 107 which is currently executing non-customer work on a functional processor 402. Otherwise, if the autonomous specific domain is pre-assigned, Resource Initializer 115 verifies that the resources specified exist in a useable state. If not, the requested non-customer operation is rejected and an error message presented to the requesting software. If the shared specific domain is partially or fully complete, Resource Initializer 115 examines the state of specified resources to determine whether they exist in a useable state. If not, the non-customer operation is rejected at this point and an error message is transmitted to the software that has requested the operation. The Resource Initializer 115 also assigns resources for any shared domain resource type indicated in the generalized domain for which no specific resource identity exists. To this end, Resource Initializer 115 selects resources from those currently known to exist in a useable state. Data indicative of the set of all resources and their current states is maintained in a set of resource maps that are stored in memory 119 and can take any one of a number of different forms selected by the system designer. Once the Resource Initializer 115 has assigned all the resources necessary to implement the non-customer operation, and verified the status of these resources, the resources are assigned by Domain Association Module 114 to the end of the selected one of queues 107 assigned to this autonomous specific domain. As noted earlier, each autonomous specific domain refers to a single control region within the customer system. For a multiplicity of non-customer operations as associated into the selected queue, the Domain Association Module 114 performs the function of maintaining the suppression status for deferred resource recovery within the domain recovery flags in the generalized domain.

Availability Monitor

Availability Monitor 116 operates on command from execution module 118 to examine one of the non-customer operations in a selected one of the plurality of the queues 107 to look for availability impacts. Availability Monitor 116 examines the resources that are identified by the Resource Initializer 115 and listed in both the autonomous and shared specific domains that are stored in the queue to determine if the use of these resources for a non-customer operation would cause an availability impact to a customer operation on the customer system. Availability Monitor 116 performs this task by means of a resource map stored in memory 119 and an overlay mechanism. The overlay mechanism is an internal depiction of the subsystem node-path network. The resource map stored in memory 119 is updated each time a change in a node state is detected or confirmed. If the measured availability impact is greater than the maximum allowable impact, the non-customer operation is either put on hold pending resource availability or canceled. The option of whether to wait for resources or cancel the operation is assigned to the non-customer operation by the originating software. Finally, Availability Monitor 116 determines that the selected non-customer operation passes the availability criteria and notifies execution module 118 that the non-customer operation is ready for execution. Execution involves several steps and is controlled by the execution module 118.

Domain Quiesce Module

Domain quiesce module 117 examines all resources that have been indicated within the autonomous and shared specific domains. Referring to line C of FIG. 3, for each resource specified, domain quiesce module 117 issues one or more messages to a functional processor 402 to terminate customer operations on the resource and place the resource in a state in which it cannot be accessed for customer use. This operation effectively fences the resources required to implement the non-customer operation to prevent any functional processors 402 from retrieving these resources in a customer operation. The order of resource quiesce takes the form of concentric isolation in which accesses external to the autonomous specific domain are first disabled, then resources shared among autonomous specific domains, then non-functional processor resources within the autonomous specific domain, and finally the functional processors within the autonomous specific domain. Therefore, for the example used above, the resources from the autonomous specific domain are isolated from external sources of new work. The functional processors 402-0, 402-1 of the autonomous specific domain are blocked from the channel adapters 501* contained within the channel interface 409 in such a manner that new work appearing on any of the data channels 410* is passed to a functional processor outside of the autonomous specific domain. Once this operation has been completed, the functional processors 402-0, 402-1 complete all old work. The functional processors 402-0, 402-1 complete any pending channel operations and present the results to the data channels 410-* to the host processors 405-*. On completion of this activity, the functional processors 402-0, 402-1 do not accept or originate any new channel oriented work. This step does not disable background processing such as cleanups and routine message routing. However, the functional processors 402-0, 402-1 cannot be selected to perform recovery in the event of a failure of a customer operation since the functional processors 402-0, 402-1 are fenced by the domain quiesce module 117. The resources from the shared specific domain are then isolated if they can be the source of new work to any functional processor, including any processor that is selected as part of the autonomous specific domain. This involves removing channel adapter 501-0 that is specified in the shared specific domain from operation after any owed responses to that channel adapter 501-0 are complete. During this activity, no new work is accepted from that channel adapter 501-0. The resources from the shared specific domain that may be the target of operations are removed from service after protecting or relocating any customer data, to allow continuous access to that data. These types of resources include cache memory 406 and the disk drive array 407 that can be accessed from multiple functional processors. Furthermore, all resources within the autonomous specific domain except for functional processors 402-0, 402-1 are quiesced and electronically reset. This includes the automatic data transfer circuit 502-0 and the cache interface circuit 503-0 that are contained within the control region 500-0 in which the selected functional processors 402-0, 402I-1 are located. Finally, the functional processors 402-0, 402-1 within the autonomous specific domain are quiesced. This step involves waiting until all tasks that are presently activated report that there are no outstanding requirements that remain to be satisfied. It is not desirable to halt the functional processors 402-0, 402-1 since their internal code must normally be operable in order to process a non-customer operation.

Resource recovery is accomplished in a fashion which is the general inverse of the resource quiesce operation. For the example used above, the resources specified in the shared specific domain are restored first. Each resource is reset, initialized and then made available for functional use by processors outside of the autonomous specific domain. These processors perform the steps of the stabilization of resource circuits, reloading and verification of resource code, initialization of resource registers, and the release of resource arbitration locks. After shared specific domain resources are restored, the autonomous specific domain resources are similarly restored. The functional software on processors 402-0, 402-1 is validated using Cyclical Redundancy Checking or other methods common to the art. If the software has been corrupted by the non-functional process, then the processor is reset and reinitialized with new software. Then the processor is started and its local data areas are reinitialized as necessary. Processors 402-0, 402-1 are then used to perform the steps of reset and reinitialization of all other resources within the autonomous specific domain. This includes the automatic data transfer circuit 502-0 and the cache interface circuit 503-0 that are contained within the control region 500-0 in which the selected functional processors 402-0, 402-1 are located. Finally processors 402-0, 402-1 are placed online to the channel adapters 501* and to the other processors 402-* in functional control regions 500-*. In this state they can once again receive new work from host processors 405-* via data channels 410-*.

Execution Module

Figure 2:
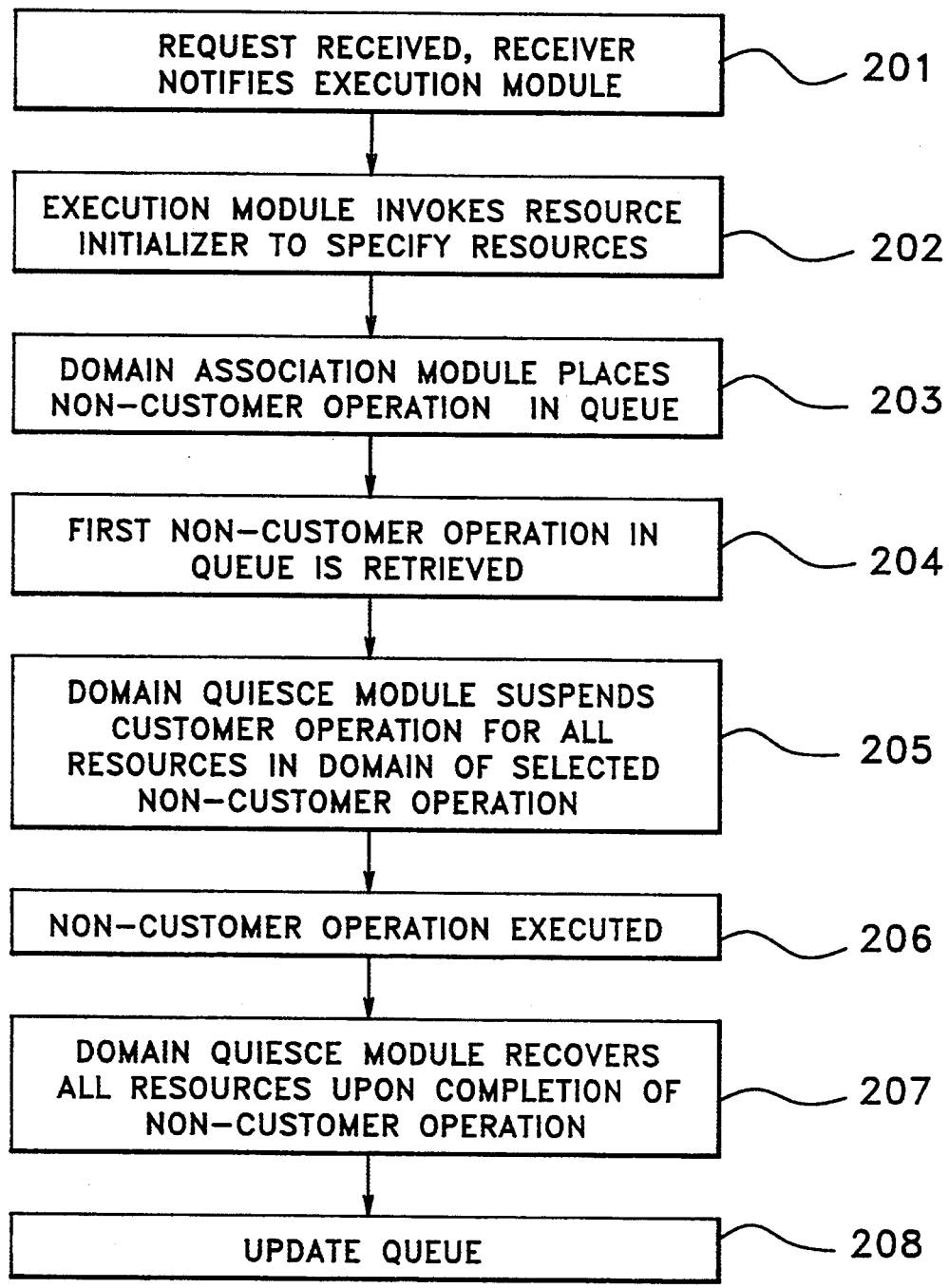
FIG. 2 illustrates the operation of this apparatus in flow diagram form.

Execution module 118 manages the state of execution of each non-customer operation that is listed in the plurality of queues 107. Execution module 118 manages, in sequential fashion, the plurality of non-customer operations by monitoring the progress of a non-customer operation through the various stages of association, initialization, availability, quiesce, and execution. This operation is illustrated in flow diagram form in FIG. 2. At step 201, receiver 111 notifies execution module 118 that a new non-customer operation has been received. At step 202, execution module 118 invokes Resource Initializer 115 to specify all resources in the generalized domain A that have not been specified. The specification process places specific values in the generalized domain A to create the autonomous and shared specific domains C. At step 203, execution module 118 invokes Domain Association Module 114 to associate the non-customer operation to one of the plurality of queues 107 and perform the necessary queue management functions. If the new non-customer operation is the only member of this selected queue, no further queue action is taken. Otherwise, the new non-customer operation is placed at the end of the selected queue, and domain recovery flags 312, 313 of the new non-customer operation are set to indicate that all resource recovery is necessary at completion of the non-customer operation. The domain recovery flag 312 of the immediately prior non-customer operation in the queue is set to indicate that autonomous specific domain recovery is to be deferred on completion of the prior operation. Then Domain Association Module 114 compares the shared specific domains C of the new and prior operations. If these two domains are identical, the domain recovery flags 312, 313 of the immediately prior non-customer operation are set to indicate that the shared specific domain recovery is to be deferred on completion of the prior operation. If the shared specific domains are not identical, then the domain recovery flag 312 of the immediately prior non-customer operation is set to indicate that shared domain recovery is necessary after completion of the prior operation. At step 204, each non-customer operation, once assigned to a selected queue, is processed as it reaches the head of the queue. The processing steps are designed to prepare the resource environment for the operation, and clean up the environment following completion of this operation. The first step of operation is for the Availability Monitor 116 to determine whether sufficient resource availability exists. If there are not sufficient resources to execute this operation, and the domain recovery flags 312, 313 are set to indicate that the operation should be canceled, then full resource recovery is necessary. The domain recovery flags 312, 313 of the succeeding operation, if any, are also set to indicate full resource recovery is necessary. Domain Quiesce Module 117 is invoked to perform full resource recovery. The Domain Quiesce Module 117 continuously monitors the state of all resources so that it does not attempt to recover resource which is already in a recovered state. The non-customer operation is then removed from the queue and a rejection is returned to the failure management task. Alternatively, if the domain recovery flags 312, 313 are set to indicate that the operation should be postponed, then no further action is taken on this queue until some event occurs which indicates time has elapsed or other resources have been recovered to enable the Availability Monitor 116 to determine that sufficient resources are available to execute the non-customer operation without impacting the customer operations.

At step 205, the non-customer operation is ready for execution. Execution Module 118 invokes the Domain Quiesce Module 117 to suspend customer activity according to the settings in the domain recovery flags 312, 313 and the specifications in the specific domain C. Upon completion of this activity, the resource environment is in a state that permits execution of the selected non-customer operation without damaging on-going customer operations. In the example noted above, this entails quiescing a selected control region in addition to sufficient shared resources to execute the non-customer operation. At step 206, execution module 118 transports the non-customer operation to one or more of the functional processors 402-0, 402-1 in the autonomous specific domain. The transported non-customer operations may be in the form of stored programs that are executed by the functional processor 402-0, 402-1 or code which is transported into the functional processor overlay space and executed. Various forms of status are returned from the executing functional processor 402-0, 402-1, including final completion status. All statuses are relayed by execution module 118 to the originating task. At step 207, upon completion of the execution of the non-customer operation, execution module 118 again calls Domain Quiesce Module 117, this time to perform resource recovery. Resource recovery proceeds according to the settings in the domain recovery flags 312, 313. At this point, some or all resource recovery may be deferred based on the setting of domain recovery flags 312, 313 as noted above if subsequent non-customer operations require use of the same resources. When recovery is completed, execution module 118 issues a completion status to the requesting task on the support processor 403. At step 208, domain association module 114 is invoked to remove the completed non-customer operation from the selected queue and promote the next operation to the head of that specific queue.

Processing of Multiple Non-Customer Operations

As noted above, multiple non-customer operations can be scheduled or a request can be expanded into multiple non-customer operations by the expansion software 112. When multiple non-customer operations are scheduled, the deffered resource recovery apparatus 100 makes use of grouping logic to efficiently cycle the resources into and out of customer service. This grouping logic identifies resources that are used in common during the multiplicity of non-customer operations. Non-customer operations that use the same shared resources are queued so that they execute one after another. The benefit of this resource grouping is that it is only necessary to perform the resource selection and customer activity suspension operations on these common resources once, when the first non-customer operation in the queue is selected and executed. It is also possible to defer the recovery of these resources to customer operations until the last queued non-customer operation that requires use of these resources is complete.

FIG. 6 illustrates a chart of four sequential non-customer operations that are interrelated and share common shared resources. An example of such a sequence of operations can be when test data is received from a host processor 405 and used to update a data record that is stored in the disk drive array 407. To accomplish this, the data record is staged from a redundancy group in the disk drive array 407 to the cache memory 406 in anticipation of the receipt of new data from one of the host processors 405-0. Once the data record is staged to the cache memory 406, the host processor 405-0 transmits the data to the cache memory 406 where it is used to update the retrieved data record. The updated version of the retrieved data record is then restaged to an available redundancy group in the disk drive array 407 to maintain a permanent copy thereof. This updated data record can also be transmitted back to the originating host processor 405-0 to determine whether the data record has been properly updated with the new data. This test sequence of operations requires the execution of the four non-customer operations denoted A-D in FIG. 6. The table of FIG. 6 is analogous in structure to that illustrated in FIG. 3.

First Non-Customer Operation in Sequence

The first operation that is executed in this sequence of operations is labeled column A in FIG. 6 and consists of the specified data record being retrieved from its storage location in the disk drive array 407 and loaded into available memory space, in cache memory 406. To accomplish this, the specific domain illustrated in column A is created by the Resource Initializer 115 as noted above. Resource Initializer 115 selects one of the available control regions 500-0 and places an indicator CR0 into the identification of the resource type 601 associated with control region identification. Since no communication takes place during this operation with any of the host processors 405-*, the channel adaptor type entry 602 contains a zero in the valid row 612 to indicate that no channel adaptor is required for this operation. However, a cache control type 603, a cache RAM type 604 and a disk drive array type 605 are all required to accomplish this operation and the respective valid flags 614-617 are populated with a 1 bit to indicate that these elements are required for this non-customer operation. The Resource Initializer 115 selects available elements such as cache control 504-1 and signifies the selection by placing the designation CC1 in the appropriate location in the row associated with cache control type 603. The cache RAM 505 selected by the resource initializer 115 is cache RAM 505-0 and the Resource Initializer 115 places a CR0 indication in the row associated with the cache RAM type entry 604. Finally, the Resource Initializer 115 selects redundancy group 412-1 and signifies the selection by placing the designation RG1 in the row associated with the disk drive array type resource 605. Thus, column A indicates the specific domain required to implement the data record staging from disk drive array 407 to cache memory 406.

Second Non-Customer Operation in Sequence

The second operation in the sequence requires that data be received from the host processor 405-0 and stored in cache memory 406 to be used to update the retrieved data record. For this operation, the disk drive array type resource row 605 has a zero indicator placed in the valid field 615 to indicate that it is not required for this operation. Instead, a channel adaptor type resource row 602 has a valid indicator bit of 1 placed in valid field 612 to indicate that a channel adaptor circuit is required for this operation. Since all the other resources that were used for the non-customer operation specific domain defined in column A are still necessary to be used for this second operation, the resource initializer 115 duplicates those entries into column B to simplify the resource allocation process. The only additional element that must be allocated is a channel adaptor and, in the example shown in FIG. 6, Resource Initializer 115 selects channel adaptor 501-0 and places the indication CO in the row associated with channel adaptor type resource 602 to indicate this specific resource has been selected to complete the specific domain defined for the non-customer operation of column B.

Third Non-Customer Operation in Sequence

The third non-customer operation that is required to implement this sequence requires that the updated data record be desraged from cache memory 406 to disk drive array 407. The elements required for this operation are the identical elements that were used for the staging operation denoted in column A in Figure 6. Therefore, Resource Initializer 115 replicates the entries from column A into column C in order to minimize the number of resources that must be selected and conditioned for use in executing this non-customer operation.

Fourth Non-Customer Operation in Sequence

Finally, the last non-customer operation in the sequence is the transmission of the updated data record back to the host processor 405-0. This operation requires the identical resources that were designated in column B with the simple differentiation that the data is transmitted from the cache memory 406 to host processor 405-0 instead of the reverse direction as happened in the non-customer operation of column B. Therefore, all of the entries of column B are replicated by the Resource Initializer 115 into column D in order to define the specific domain required to implement the non-customer operation. It is evident from the table of FIG. 6 that a sequence of non-customer operations can share common resources, thereby minimizing the fencing operation that is required to idle a particular resource for use by a non-customer operation and the resource recovery that must take place upon completion of that non-customer operation. Thus, all of the elements denoted in column A are made available since this is the first non-customer operation at the head of the queue. By using a look ahead operation through the queued non-customer operations of columns B, C and D, Resource Initializer 115 achieves significant efficiency by reusing all of the elements designated in column A and adding the channel adaptor 501-0 for operations of column B and D. None of the resources used in columns A and B must be recovered until the completion of the operation of column C wherein the disk drive array redundancy group 112-1 designated by indicator RG1 is no longer required for any subsequent non-customer operations. Therefore, upon completion of the non-customer operation of column C wherein the updated data record is the stage to disk drive array 407, the redundancy group 112-1 can be restored to availability for customer operations since it is not required for any subsequent customer operation. The deferral of recovery of this redundancy group 112-1 has been delayed from non-customer operation A until non-customer operation C since the look-ahead function noted that it would be required for a subsequent queued non-customer operation. Similarly, the channel adapter 501-0 selected and used for the non-customer operation for column B is not recovered until completion of the non-customer operation of column D since it must be used to transfer the updated data record to the host processor 405-0. In order to denote this deferred recovery status of all these elements, the recovery flags 612, 613 are set to a one state to indicate that recovery is deffered until the final operation noted in column D has been completed.

Resource Recovery

The resource recovery requires that all resources that may be tainted by non-customer operations are completely removed from access and interface with customer operations. Upon the completion of the non-customer operation, these isolated resources must be restored to a known good state and any processor that is used in the non-customer operation must have its internal software and data checked for corruption and reloaded if necessary. The entire cycle of processor bring up may be monitored in this operation for errors indicative of corruption of the processors software. Therefore, the resource recovery operation must completely recover all of the resources in the non-customer operation to a known good state before releasing these resources back into the shared environment for use by customer operations.

While a specific embodiment of this invention has been disclosed, it is expected that those skilled in the art can and will design alternate embodiments of this invention that fall within the scope of the appended claims.

We claim:

1. Apparatus in a customer system, which performs customer operations, which customer system includes a plurality of redundant operational elements, each interconnected to at least one other operational element via an interconnection path, for controllably isolating operational elements in said customer system to perform a non-customer. operation concurrently with the execution of customer operations in said customer system, comprising:

means for storing data identifying said operational elements and said interconnection paths in said customer system;

means, responsive to receipt of a request to execute a non-customer operation, for retrieving a portion of said data from said storing means to identify a set of said operational elements and said interconnection paths connected to said set of operational elements that are required to execute said non-customer operation comprising:

means responsive to receipt of said request to execute said non-customer operation for mapping said requested non-customer operation into a series of operational sequences of customer system operation that correspond to said requested non-customer operation;

means for selectively disabling the use of said set of operational elements, as identified by said retrieving means, by said customer system for customer operations;

means for executing said non-customer operation concurrently with customer operations, using said set of operational elements;

means, responsive to completion of said non-customer operation, for restoring said set of operational elements to an idle state; and means for enabling the use of said set of operational elements by said customer system for customer operations.

2. The apparatus of claim 1 wherein said plurality of operational elements comprise a predetermined number of types of elements, said retrieving means comprises:
   means for translating each said operational sequence that corresponds to said requested non-customer operation into a definition of a subset of said types of elements required to implement said non-customer operation; and
   means for selecting a one of said operational elements in each type defined in said subset.

3. Apparatus in a customer system, which performs customer operations, which system includes a plurality of redundant operational elements, each interconnected to at least one other operational element via an interconnection path, for controllably isolating operational elements in said customer system to perform a non-customer operation concurrently with the execution of customer operations in said customer system, comprising:
   means for storing said operational elements and said interconnection paths in said customer system;
   means, responsive to receipt of a request to execute a non-customer operation, for retrieving a portion of said data from said storing means to identify a set of said operational elements and said interconnection paths connected to said set of operational elements that are required to execute said non-customer operation, comprising:
   means for translating said non-customer operation into a definition of a subset of said types of elements required to implement said non-customer operation; and
   means for selecting a one of said operational elements in each type defined in said subset;
   means for selectively disabling the use of said set of operational elements, as identified by said retrieving means, by said customer system for customer operations;
   means for executing said non-customer operation concurrently with customer operations, using said set of operational elements;
   means, responsive to completion of said non-customer operation, for restoring said set of operational elements to an idle state; and
   means for enabling the use of said set of operational elements by said customer system for customer operations.

4. The apparatus of claim 3 wherein said retrieving means further comprises:
   means for verifying that selection of a one of said operational elements in each type defined in said subset does not reduce the number of said operational elements in each type defined in said subset below a predetermined minimum number.

5. The apparatus of claim 3 wherein said retrieving means further comprises:
   means for verifying that at least one of said operational elements exists in said customer system for each type defined in said subset.

6. The apparatus of claim 3 wherein said retrieving means further comprises:
   means, responsive to data contained in said non-customer operation request identifying specific operational elements, for assigning said identified specific operational elements to said corresponding types in said subset.

7. The apparatus of claim 3 wherein said storing means stores data indicative of the autonomous and shared resource nature of said operational elements, said retrieving means further comprises:
   means, responsive to receipt of a plurality of non-customer operation requests, for queuing said plurality of requests;
   means for examining said plurality of queued requests to identify types of autonomous operational elements common to at least two of said plurality of queued requests; and
   wherein said selecting means assigns a single autonomous operational element to said common type in said at least two queued requests.

8. The apparatus of claim 7 wherein said retrieving means further comprises:
   means for queuing said non-customer operations by common single autonomous operational element.

9. The apparatus of claim 3 wherein said selective disabling means comprises:
   means for verifying that each selected operational element in each type defined in said set is not in use;
   means, responsive to said set of operational elements not being in use, for identifying all said interconnection paths connected to said set of operational elements; and
   means for writing data identifying said set of operational elements and said identified interconnection paths connected to said set of operational elements into a memory to prevent customer operations from selecting any of said identified set of operational elements.

10. The apparatus of claim 9 wherein said restoring means comprises:
    means for verifying that each selected operational element in each type defined in said set is not in use;
    means, responsive to said set of operational elements not being in use, for identifying all said interconnection paths connected to said set of operational elements; and
    means for deleting data identifying said set of operational elements and said identified interconnection paths connected to said set of operational elements from said memory to enable customer operations from selecting any of said identified set of operational elements.

11. The apparatus of claim 10 further comprising:
    means for suspending non-customer operation by temporarily erasing said written data from said memory that identifies at least one selected operational element to enable said customer operations to utilize said at least one operational element.

12. The apparatus of claim 3 wherein said storing means stores data indicative of the autonomous and shared resource nature of said operational elements, said selectively disabling means comprises:
    means for discontinuing customer operations in each autonomous element of said set of operational elements;
    means for discontinuing customer operations in each shared element of said set of operational elements;
    means, responsive to said set of operational elements not being in use, for identifying all said interconnection paths connected to said set of operational elements; and means for writing data identifying said set of operational elements and said identified interconnection paths connected to said set of operational elements into a memory to prevent customer operations from selecting any of said identified set of operational elements.

13. The apparatus of claim 12 wherein said restoring means comprises:
   means for verifying that each selected operational element in each type defined in said set is not in use;
   means, responsive to said set of operational elements not being in use, for identifying all said interconnection paths connected to said set of operational elements; and
   means for deleting data identifying said set of operational elements and said identified interconnection paths connected to said set of operational elements from said memory to enable customer operations from selecting any of said identified set of operational elements.

14. The apparatus of claim 12 further comprising:
   means for suspending non-customer operation by temporarily erasing said written data from said memory that identifies at least one selected operational element to enable said customer operations to utilize said at least one operational element.

15. A method in a customer system, which performs customer operations, which customer system includes a plurality of redundant operational elements, each interconnected to at least one other operational element via an interconnection path, for controllably isolating operational elements in said customer system to perform a non-customer operation concurrently with the execution of customer operations in said customer system, comprising the steps of:
   storing in a resource memory data identifying said operational elements and said interconnection paths in said customer system;
   retrieving, in response to receipt of a request to execute a non-customer operation, a portion of said data from said resource memory to identify a set of said operational elements and said interconnection paths connected to said set of operational elements that are required to execute said non-customer operation, comprising;
   mapping, in response to receipt of said request to execute said non-customer operation, said requested non-customer operation into a series of operational sequences of customer system operation that correspond to said requested non-customer operation;
   selectively disabling the use of said set of operational elements, as identified by said step of retrieving, by said customer system for customer operations;
   executing said non-customer operation concurrently with customer operations, using said set of operational elements;
   restoring, in response to completion of said non-customer operation, said set of operational elements to an idle state; and
   enabling the use of said set of operational elements by said customer system for customer operations.

16. The method of claim 15 wherein said plurality of operational elements comprise a predetermined number of types of elements, said step of retrieving comprises:
   translating each said operational sequence that corresponds to said requested non-customer operation into a definition of a subset of said types of elements required to implement said non-customer operation; and
   selecting a one of said operational elements in each type defined in said subset.

17. A method in a customer system, which performs customer operations, which customer system includes a plurality of redundant operational elements, each interconnected to at least one other operational element via an interconnection path, for controllably isolation operational element in said customer system to perform a non-customer operation concurrently with the execution of customer operations in said customer system, comprising the steps of;
   storing in a resource memory data identifying said operational elements and said interconnection paths in said customer system;
   retrieving, in response to receipt of a request to execute a non-customer operation, a portion of said data from said resource memory to identify a set of said operational elements and said interconnection paths connected to said set of operational element that are required to execute said non-customer operation, comprising:
   translating said non-customer operation into a definition of a subset of said types of elements required to implement said non-customer operation; and
   selecting a one of said operational elements in each type defined in said subset;
   selectively disabling the use of said set of operational elements, as identified by said step of retrieving, by said customer system for customer operations;
   executing said non-customer operation concurrently with customer operations, using said set of operational elements;
   restoring, in response to completion of said non-customer operation, said set of operational elements to an idle state; and
   enabling the use of said set of operational elements by said customer system for customer operations.

18. The method of claim 17 wherein said step of retrieving further comprises:
   verifying that selection of a one of said operational elements in each type defined in said subset does not reduce the number of said operational elements in each type defined in said subset below a predetermined minimum number.

19. The method of claim 17 wherein said step of retrieving further comprises:
   verifying that at least one of said operational elements exists in said customer system for each type defined in said subset.

20. The method of claim 17 wherein said step of retrieving further comprises:
   assigning, in response to data contained in said non-customer operation request identifying specific operational elements, said identified specific operational elements to said corresponding types in said subset.

21. The method of claim 17 wherein said resource memory stores data indicative of the autonomous and shared resource nature of said operational elements, said step of retrieving further comprises:
   queuing, in response to receipt of a plurality of non-customer operation requests, said plurality of requests;
   examining said plurality of queued requests to identify types of autonomous operational elements common to at least two of said plurality of queued requests; and wherein said step of selecting assigns a single autonomous operational element to said common type in said at least two queued requests.

22. The method of claim 21 wherein said step of retrieving further comprises:
queuing said non-customer operations by common single autonomous operational element.

23. The method of claim 17 wherein said step of selective disabling comprises:
verifying that each selected operational element in each type defined in said set is not in use;
identifying, in response to said set of operational elements not being in use, all said interconnection paths connected to said set of operational elements; and
writing data identifying said set of operational elements and said identified interconnection paths connected to said set of operational elements into a memory to prevent customer operations from selecting any of said identified set of operational elements.

24. The method of claim 23 wherein said step of restoring comprises:
verifying that each selected operational element in each type defined in said set is not in use;
identifying, in response to said set of operational elements not being in use, all said interconnection paths connected to said set of operational elements; and
deleting data identifying said set of operational elements and said identified interconnection paths connected to said set of operational elements from said memory to enable customer operations from selecting any of said identified set of operational elements.

25. The method of claim 23 further comprising:
suspending non-customer operation by temporarily erasing said written data from said memory that identifies at least one selected operational element to enable said customer operations to utilize said at least one operational element.

26. The method of claim 17 wherein said resource memory stores data indicative of the autonomous and shared resource nature of said operational elements, said step of selectively disabling comprises:
discontinuing customer operations in each autonomous element of said set of operational elements;
discontinuing customer operations in each shared element of said set of operational elements;
identifying, in response to said set of operational elements not being in use, all said interconnection paths connected to said set of operational elements; and
writing data identifying said set of operational elements and said identified interconnection paths connected to said set of operational elements into a memory to prevent customer operations from selecting any of said identified set of operational elements.

27. The method of claim 26 wherein said step of restoring comprises:
verifying that each selected operational element in each type defined in said set is not in use;
identifying, in response to said set of operational elements not being in use, all said interconnection paths connected to said set of operational elements; and
deleting data identifying said set of operational elements and said identified interconnection paths connected to said set of operational elements from said memory to enable customer operations from selecting any of said identified set of operational elements.

28. The method of claim 26 further comprising:
suspending non-customer operation by temporarily erasing said written data from said memory that identifies at least one selected operational element to enable said customer operations to utilize said at least one operational element.

* * * * *